(12) United States Patent
Moulsley

(10) Patent No.: US 6,611,514 B1
(45) Date of Patent: Aug. 26, 2003

(54) RADIO COMMUNICATION SYSTEM

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/473,534

(22) Filed: Dec. 28, 1999

(30) Foreign Application Priority Data

Jan. 9, 1999 (GB) .............................................. 9900389

(51) Int. Cl.[7] .............................................. H04B 7/212
(52) U.S. Cl. ...................... 370/348; 370/322; 370/329; 370/341; 370/349; 370/443
(58) Field of Search ................. 370/321, 322, 370/329, 335, 336, 337, 341, 342, 345, 347, 348, 349, 443, 461, 462, 479; 455/434, 450

(56) References Cited

U.S. PATENT DOCUMENTS

| | | | | |
|---|---|---|---|---|
| 5,012,469 A | * | 4/1991 | Sardana ...................... 370/322 |
| 5,166,929 A | * | 11/1992 | Lo .............................. 370/85.3 |
| 5,303,234 A | * | 4/1994 | Kou ............................ 370/442 |
| 5,420,864 A | * | 5/1995 | Dahlin et al. ............... 370/95.3 |
| 5,677,909 A | * | 10/1997 | Heide ......................... 370/347 |
| 5,726,981 A | * | 3/1998 | Ylitervo et al. ............. 370/332 |
| 5,818,829 A | * | 10/1998 | Raith et al. ................. 370/347 |
| 6,163,533 A | * | 12/2000 | Esmailzadeh et al. ...... 370/342 |
| 6,236,646 B1 | * | 5/2001 | Beming ....................... 370/335 |
| 6,256,301 B1 | * | 7/2001 | Tiedemann, Jr. et al. ... 370/342 |
| 6,259,724 B1 | * | 7/2001 | Esmailzadeh ............... 375/143 |
| 6,381,229 B1 | * | 4/2002 | Narvinger et al. .......... 370/328 |

FOREIGN PATENT DOCUMENTS

WO WO9913600 3/1999 ............ H04B/7/26

* cited by examiner

Primary Examiner—William Trost
Assistant Examiner—James Ewart
(74) Attorney, Agent, or Firm—Jack D. Slobod

(57) ABSTRACT

A radio communication system in which secondary stations can request services from a primary station using random access or dedicated signalling methods. The primary station partitions a single uplink channel between random access and dedicated signalling transmissions, thereby enabling the advantages of both types of transmissions to be provided on a single channel without the need for the duplication of hardware otherwise required to handle two different types of channel.

7 Claims, 5 Drawing Sheets

RADIO COMMUNICATION SYSTEM

The present invention relates to a radio communication system, and further relates to primary and secondary stations for use in the system and to a method of operating the system. While the present specification describes a system with particular reference to the emerging Universal Mobile Telecommunication System (UMTS), it is to be understood that such techniques are equally applicable to use in other mobile radio systems.

In a radio communication system it is generally required to be able to exchange signalling messages between a Mobile Station (MS) and a Base Station (BS). Downlink signalling (from BS to MS) is usually realised by using a physical broadcast channel of the BS to address any MS in its coverage area. Since only one transmitter (the BS) uses this broadcast channel there is no access problem.

In contrast, uplink signalling (from MS to BS) requires more detailed considerations. If the MS already has an uplink channel assigned to it, for voice or data services, this signalling can be achieved by piggy-backing, in which the signalling messages are attached to data packets being sent from the MS to the BS. However, if there is no uplink channel assigned to the MS piggy-backing is not possible. In this case a fast uplink signalling mechanism may be available for the establishment, or re-establishment, of a new uplink channel.

In many systems, for example those operating to the Global System for Mobile communication (GSM) standard, fast uplink signalling is enabled by the provision of a random access channel using a slotted ALOHA or similar protocol. However, such a scheme works satisfactorily only with a low traffic load, and is not believed to be capable of handling the requirements imposed by third-generation telecommunications standards such as UMTS.

To meet these requirements one UMTS embodiment includes a dedicated signalling channel, which comprises frames including a time slot for each MS registered with the controlling BS. If a MS requires a service from the BS it transmits a request in its allocated slot then waits for an acknowledgement from the BS setting up the required service. Some advantages of such a scheme are that the signalling is more efficient than with a random access channel, as there is no transmission of a large message; and that there is no risk of collisions, as each MS is allocated a unique time slot.

However, the provision of a dedicated signalling channel also has some disadvantages. The complexity of a hardware implementation is increased, because of the need for additional code generators in the MS and additional matched filters in the BS. The complete system is also made more complicated because of the inclusion of another type of transport channel.

An object of the present invention is to alleviate the disadvantages of providing a dedicated signalling channel while retaining its advantages.

According to a first aspect of the present invention there is provided a radio communication system comprising a primary station and a plurality of secondary stations, the primary station having means for partitioning a single uplink transmission channel between random access and dedicated signalling transmissions from the secondary stations and means for allocating a time slot for a dedicated signalling transmission by a secondary station.

According to a second aspect of the present invention there is provided a primary station for use in a radio communication system, wherein means are provided for partitioning a single uplink transmission channel between random access and dedicated signalling transmissions from secondary stations, and for allocating a time slot for a dedicated signalling transmission by a secondary station.

According to a third aspect of the present invention there is provided a secondary station for use in a radio communication system in which a single uplink transmission channel is partitioned between random access and dedicated signalling transmissions and time slots are allocated for dedicated signalling transmissions by secondary stations, wherein means are provided for transmitting random access and dedicated signalling transmissions in the allocated portion of the channel.

According to a fourth aspect of the present invention there is provided a method of operating a radio communication system comprising a primary station and a plurality of secondary stations, the primary station partitioning a single uplink channel between random access and dedicated signalling transmissions from the secondary stations and allocating a time slot for a dedicated signalling transmission by a secondary station.

The present invention is based upon the recognition, not present in the prior art, that a random access channel and a dedicated signalling channel can be combined into a single physical channel using the same hardware for both access mechanisms.

Embodiments of the present invention will now be described, by way of example, with reference to the accompanying drawings, wherein.

In the drawings the same reference numerals have been used to indicate corresponding features.

Figure 1:
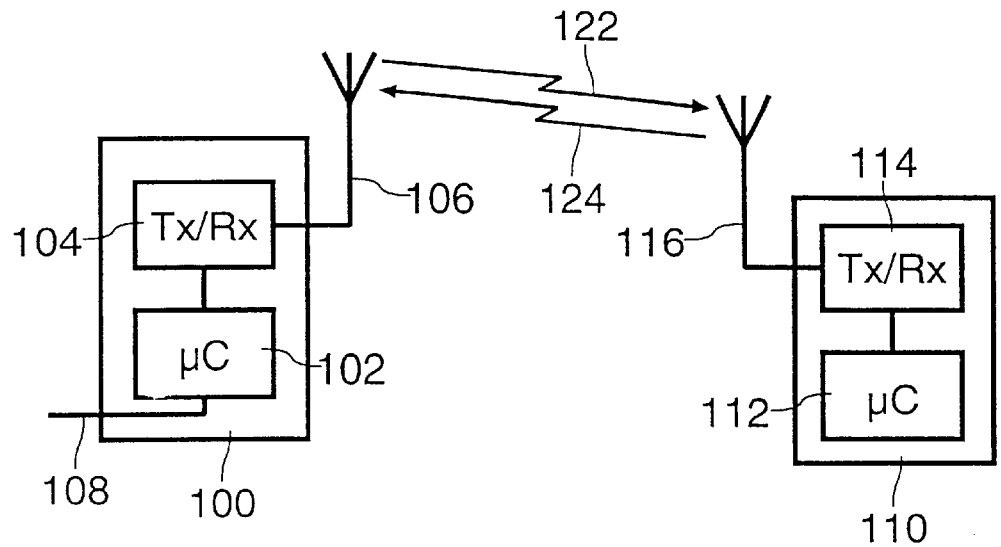
FIG. 1 is a block schematic diagram of a radio communication system.
Figure 1:
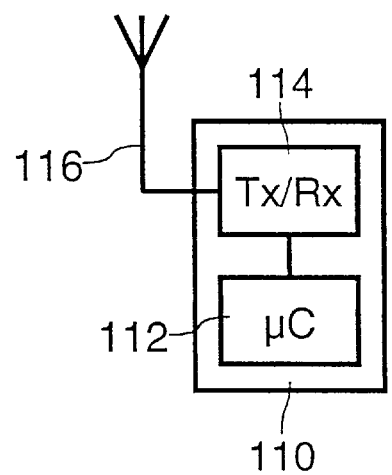

Referring to FIG. 1, a radio communication system comprises a primary station (BS) 100 and a plurality of secondary stations (MS) 110. The BS 100 comprises a microcontroller ($\mu C$) 102, transceiver means 104 connected to radio transmission means 106, and connection means 108 for connection to the PSTN or other suitable network. Each MS 110 comprises a microcontroller ($\mu C$) 112 and transceiver means 114 connected to radio transmission means 116. Communication from BS 100 to MS 110 takes place on a downlink channel 122, while communication from MS 110 to BS 100 takes place on an uplink channel 124.

The present invention is concerned with an uplink channel 124 which enables a MS 110 that does not have its own allocated uplink channel to request resources from, or transmit short messages to, the BS 100. Embodiments will be described in relation to a UMTS system employing Code Division Multiple Access (CDMA) techniques, although the techniques described are equally applicable to systems using other techniques such as Time Division Multiple Access (TDMA). Similarly, although embodiments of the present invention are described assuming frequency division duplex, the invention is not limited to use in such systems and may also be applied with other duplex methods, for example time division duplex.

Figure 2:
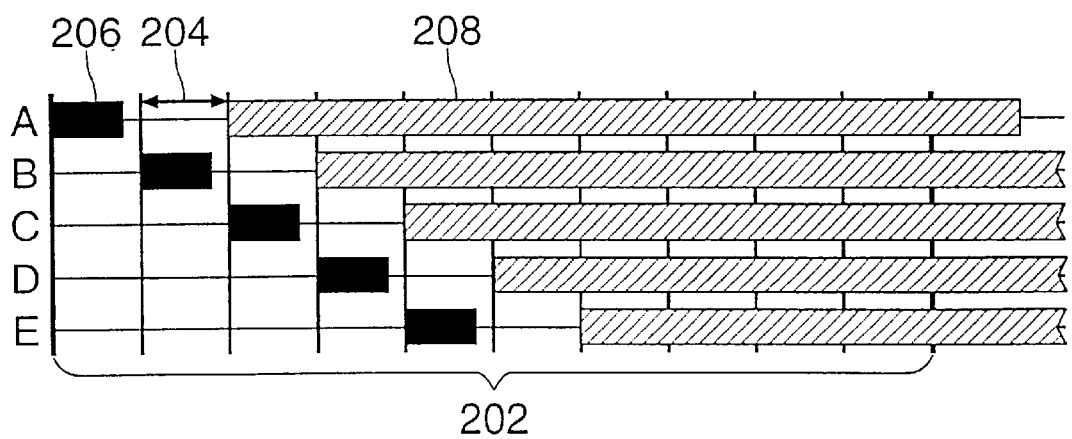
FIG. 2 illustrates a frame format for a random access channel.

One arrangement of a channel to provide such a facility in a UMTS system is a random access channel as illustrated in FIG. 2. The uplink channel is divided into a succession of frames, each of length 10 ms. An exemplary frame 202 is subdivided into a plurality of access slots 204. A MS 110 wishing to transmit randomly chooses an access slot 204 and transmits a preamble 206, which comprises one of a set of cell-specific access sequences used by any MS 110 in the cell. In one implementation an access sequence is generated by using a cell-specific code to spread a signature sequence chosen at random from a set of 16 signatures.

After a delay sufficient for the BS 100 to detect the transmitted preamble 206 and be ready to receive further transmissions, the MS 110 transmits a message 208 having a fixed length of 10 ms. The transmission of the message 208 will therefore extend beyond the end of the frame 202 in which the preamble 206 was transmitted. The message 208 can serve various functions, for example requesting a dedicated channel or transmitting a short uplink user data packet. The transmission of the message 208 is performed on a separate channel using a MS-specific spreading code, and therefore will not interfere with other transmissions on the random access channel.

The MS chooses the access slot 204 in which it transmits at random (for example using a slotted ALOHA protocol). The first five available transmission timings in a frame 202 are shown in FIG. 2, labelled A to E. Transmission of the message 208 is shown for convenience as beginning at the start of a transmission slot 204, but this alignment is not necessary in practice.

Figure 3:
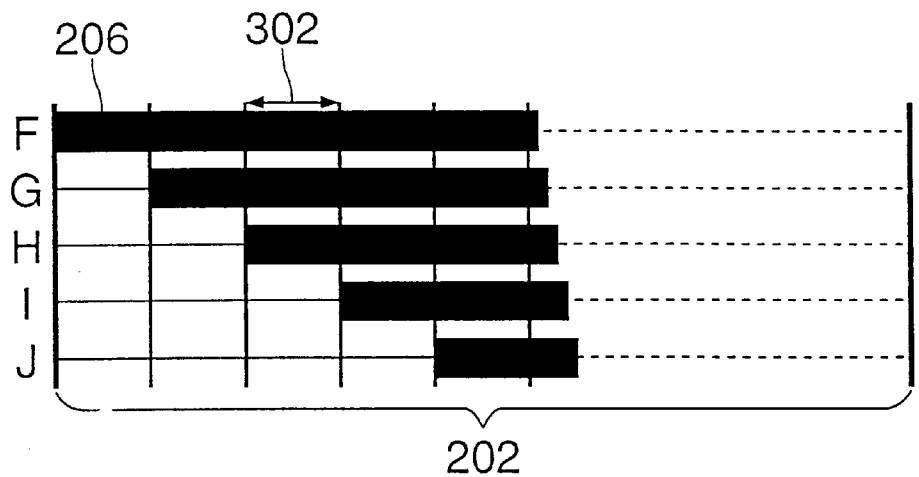
FIG. 3 illustrates a frame format for a dedicated uplink signalling channel.

An alternative arrangement of a channel to provide such a facility in a UMTS system is a channel dedicated to the transmission of requests for services by a MS 110 to a BS 100. Before using this service a MS 110 must have registered with the BS 100 and requested the provision of dedicated signalling slots (either explicitly or by default). One arrangement of such a channel for UMTS is illustrated in FIG. 3. Each MS 110 registered with the BS 100 is allocated a time slot 302 in each frame 202. In one implementation a time slot 302 has a minimum duration of 3.8 µs, 256 times less than the time taken to transmit a preamble 206.

When a registered MS 110 wishes to transmit a signal it determines its allocated time slot and transmits a preamble 206. The preamble 206 is constructed in the same way as for the random access channel, using a cell-specific code to spread a signature, but instead of a random choice of signatures a signature (or a small set of signatures) with optimum correlation properties is normally chosen for use in all preambles. This signature may for convenience be one of those available for use in a random access channel, although this is not essential. Transmission of the preamble 206 begins at the start of the allocated time slot 302. Because the time taken to transmit the preamble 206 is much longer than the duration of a time slot 302, transmissions in adjacent time slots 302 overlap, as shown in FIG. 3 where transmissions in the first five time slots of a frame 202 are shown, labelled F to J.

The access code is detected at the BS 100 by a matched filter, and the time at which a peak appears in the output of the matched filter indicates which MS 110 issued the request. Because the length of the time slot 302 is much less than the time taken to transmit the preamble 206, transmissions for adjacent time slots 302 overlap, as shown schematically in FIG. 3. The BS 100 may choose not to allocate all the available time slots in a frame 202, for example to allow for the effect of transmission delays in large cells.

Figure 4:
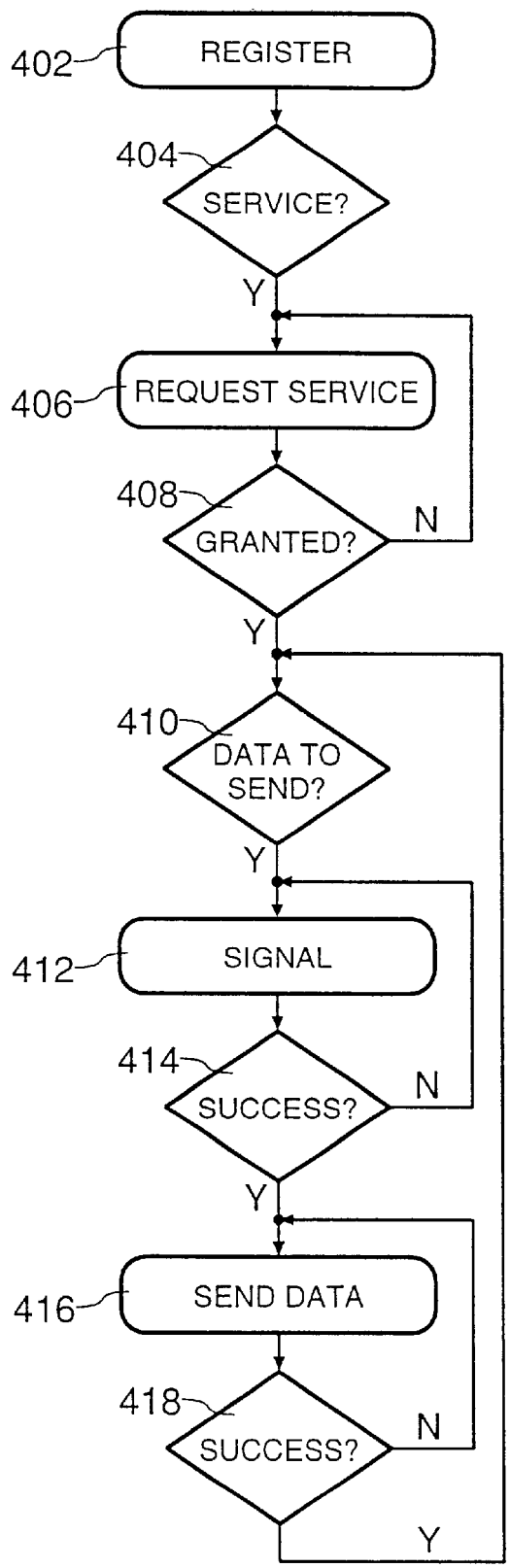
FIG. 4 is a flow chart illustrating a method of using a dedicated uplink signalling channel.

A method of using a dedicated signalling channel is shown as a flow chart in FIG. 4. When a MS 110 enters a new cell it first registers 402 with the cell's BS 100. At 404 the MS 110 determines whether it requires the provision of dedicated signalling slots. If it does, the MS 110 requests 406 that these slots are allocated by transmitting a message using a random access channel. At 408 the MS 110 determines if the requested signalling slots have been allocated. If they have not been allocated the MS 110 repeats the request 406. If they have been allocated the MS 110 waits at 410 until it has data to send, at which time it transmits 412 a preamble 206 at its allocated time in a frame 202 in the dedicated signalling channel.

At 414 the MS 110 determines if the signal has been received by the BS 100 and the required uplink resources allocated. If they have not been allocated the MS 110 repeats the signal 412, otherwise the MS 110 sends data 416 using the allocated uplink resources. Successful transmission of the data is checked at 418, and the data is retransmitted if errors have occurred. When all the data has been transmitted successfully the MS 110 returns to wait at 410 until there is more data to send.

It should be noted that such a method would normally include additional features, for example the addition of time-outs to limit the number of requests transmitted on the random access or dedicated signalling channels.

In accordance with the present invention there is provided a system enabling both random access and dedicated signalling transmissions on the same channel, using the same cell-specific spreading code to generate a preamble 206. This provides the advantages of both methods while avoiding the need for duplication of hardware. Because the same spreading code is being used to generate the preamble 206, interference between access attempts using the two methods is possible. This problem is solved by partitioning the transmission channel, and preferably each frame 202, into a plurality of portions. If more system capacity is required, multiple cell-specific spreading codes could be used, each defining a channel which could be used for random access transmissions, dedicated signalling transmissions or a combination of the two.

Figure 5:
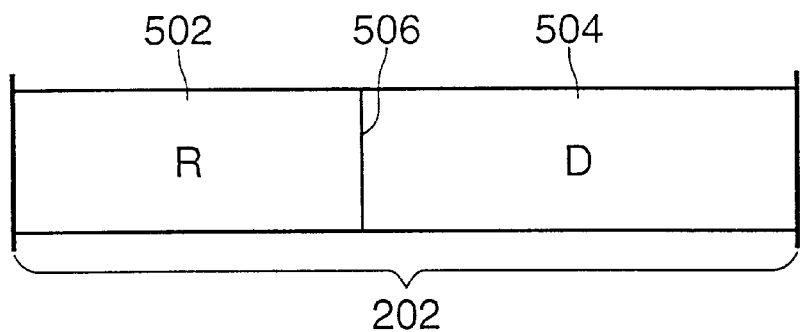
FIG. 5 illustrates one possible frame format for a combined random access and dedicated uplink signalling channel.

FIG. 5 illustrates one possible frame format, where a first part 502 of the frame 202 is allocated to random access transmissions (R) and a second part 504 of the frame 202 is allocated to dedicated signalling transmissions (D). There will be no interference between access attempts using the two methods provided that the allocations for the methods do not overlap, although in practice a small amount of overlap is tolerable provided the resulting interference is not too severe. The boundary 506 between the two parts of the frame 202 is determined by the BS 100, which transmits in a broadcast channel information regarding the available access slots for each type of transmission in each frame 202.

Figure 6:
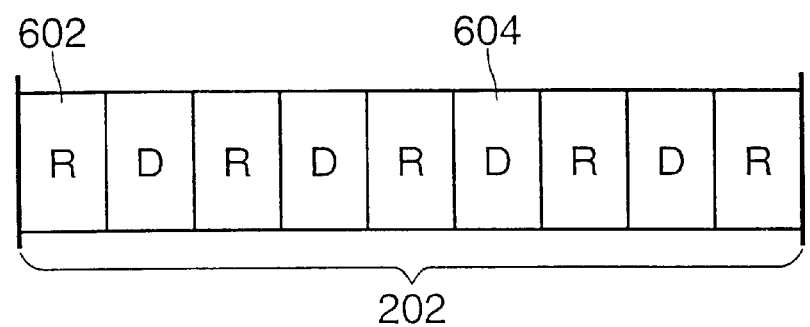
FIG. 6 illustrates an alternative frame format for a combined random access and dedicated uplink signalling channel.

Another possible frame format is illustrated in FIG. 6, where the frame 202 is subdivided into portions 602 allocated to random access transmissions (R) and portions 604 allocated to dedicated signalling transmissions (D). In one embodiment of a random access channel preamble power ramping is used, by which a MS 110 transmits a preamble 206 and waits for an acknowledgement from the BS 100 before transmitting its message 208. If no acknowledgement is received after a predetermined period the MS 110 retransmits the preamble 206 at a higher power level, and continues this process until an acknowledgement is received.

The frame format of FIG. 6 enables more frequent power ramping than that of FIG. 5, as can be illustrated by a simple example. If the predetermined time for which the MS 110 waits for an acknowledgement of a request is half of the duration of a frame 202 (i.e. 5 ms) and the MS 110 transmits its request at the start of a frame 202, only one preamble can be transmitted per frame if the format of FIG. 5 is used (assuming an even partition of the frame 202 into the parts 502 and 504). However, with the frame format of FIG. 6 two requests can be transmitted per frame because further portions 602 allocated to random access are provided in the second half of the frame. Similar considerations will apply for different delays.

Although the portions 602, 604 of the frame 202 are shown to be of equal duration in FIG. 6, a system in accordance with the present invention is not restricted to such a scheme. The only requirement is that the portions of the frame 202 allocated to each transmission method do not overlap too much. It should also be noted that there is no requirement that the whole of the frame 202 is allocated to random access or dedicated signalling transmissions: other parts of the frame 202 could be allocated for other purposes, or simply not used.

The use of one channel for both random access and dedicated signalling transmissions reduces the capacity available compared to a system where each type of transmission has its own channel. While this is not expected to be a problem, a system in accordance with the present invention has the flexibility of providing additional channels if necessary. Each additional channel could be devoted entirely to random access or dedicated signalling transmissions, or partitioned between them, as required by the traffic to be supported.

Figure 7:
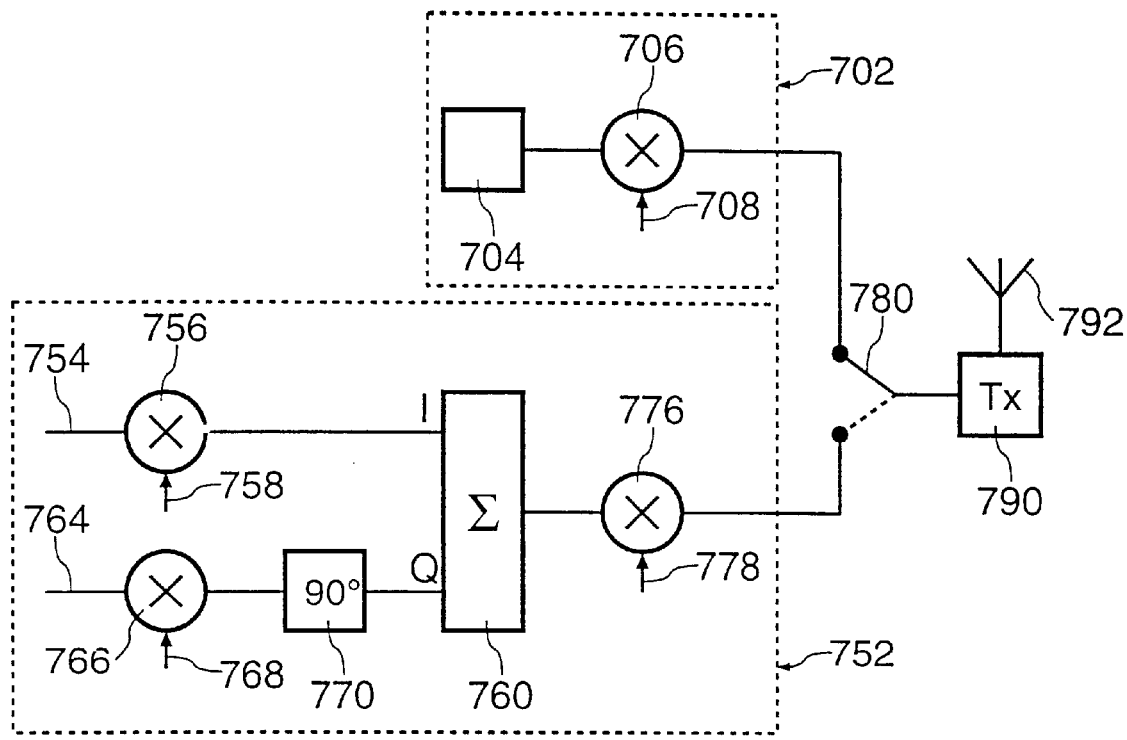
FIG. 7 is a block schematic diagram of a transmitter in a MS.

An advantage of the present invention is that it enables the same hardware to be used for both random access and dedicated signalling transmissions without duplication of code generators and matched filters. FIG. 7 is a block schematic diagram of part of a transmitter in a MS 110 made in accordance with the present invention. The transmitter comprises a preamble generation block 702 and a data coding block 752, each of which is connected as required via a switch 780 to modulation and radio transceiver means 790 and transmitted by radio transmission means 792. The switch 780 is shown connecting the preamble generation block 702 to the transceiver 790; the alternative connection of the data coding block 752 to the transceiver 790 is shown dashed.

The preamble generation block 702 comprises a signature generator 704, the output of which is spread by combining in a multiplier 706 with a cell-specific code 708. The preamble generation block 702 can be used for both random access and dedicated signalling transmissions, thereby avoiding hardware duplication. When used for a random access transmission the signature generator 704 selects a signature at random from the set of available signatures, whilst when used for a dedicated signalling transmission the appropriate predetermined signature is selected. The signature generator 704 is controlled to deliver the signature at the time required for transmission of the preamble 206.

The data coding block 752 comprises two separate channels, one for data and one for control information. The data channel processes input data 754 by combining it in a multiplier 756 with a data spreading code 758 defining the data channel, after which it forms the in-phase (I) input to a summation block 760. The control channel processes input control data 764 by combining it in a multiplier 766 with a control spreading code 768 defining the control channel. The phase of the signal is shifted through 90° C. by a phase shifter block 770 and then forms the quadrature (Q) input to the summation block 760. The combined output from the summation block 760 is further processed by combining it in a multiplier 776 with a MS-specific spreading code 778.

Figure 8:
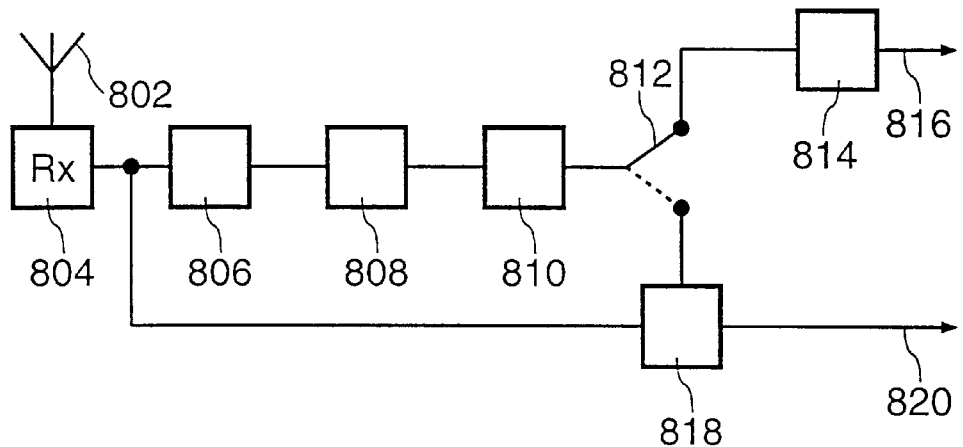
FIG. 8 is a block schematic diagram of a receiver in a BS.

FIG. 8 is a block schematic diagram of part of a receiver in a BS 100 made in accordance with the present invention. Transmissions are received by radio transmission means 802 and demodulated by demodulation means 804. The resultant signal is passed to a matched filter 806 which passes data encoded with the cell-specific code 708. The output from the filter 806 is passed to a preamble correlation block 808 which determines the correlation between the received signal and the appropriate signature. If the transmission could contain one of a number of signals (as is the case for a random access transmission, or a dedicated signalling transmission if using multiple signatures) the correlation block 808 comprises a number of parallel channels, each searching for a single signature.

Peaks in the output of the preamble correlation block 808 are detected by a peak detection block 810 (which comprises the same number of parallel channels as the correlation block 808). The output from this block is routed via a switch 812, which is controlled to switch states as a frame changes from random access to dedicated signalling transmissions and vice-versa. The switch 812 is shown in the position appropriate for dedicated signalling, routing the output of the peak detection block 810 to a timing estimator 814 which determines the time at which the peak output occurred. Output from the timing estimator 814 is passed to Medium Access Control (MAC) processing software in the receiver which determines from which MS 110 a signal has been received and takes appropriate action.

When the switch 812 is changed to the position appropriate for random access, shown dashed, the outputs of the peak detection block 810 are passed as input to an equalisation block 818 (which comprises the same number of parallel channels as the correlation block 808 and peak detection block 810). The equalisation block 818 also takes as input the output signal from the demodulation means 804, and provides as output an equalised signal 820 which is passed to packet decoding means (not shown) in the receiver to decode the data.

Figure 9:
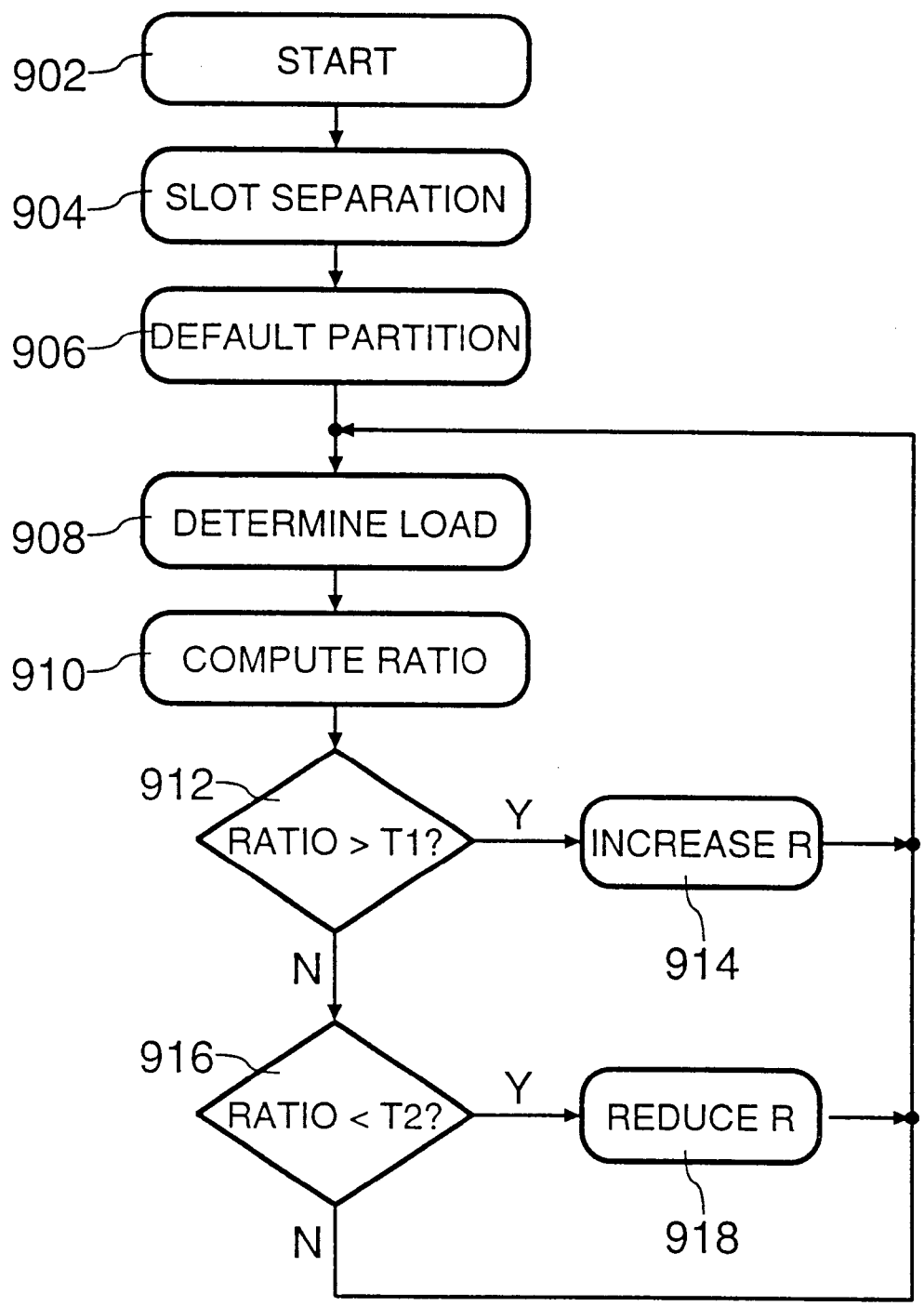
FIG. 9 is a flow chart illustrating a method of partitioning a frame between random access and dedicated signalling transmissions.

A method by which the BS 100 can control the partitioning of frames 202 between random access and dedicated signalling is shown by the flow chart of FIG. 9. After the process is started at 902 it determines at 904 the separation of dedicated signalling time slots 302, the appropriate separation being increased as the cell size increases to allow for the effects of propagation delays. A default partitioning of frames 202 between random access and dedicated signalling transmissions is made at 906, and details of this are broadcast on a physical broadcast channel to any MS 110 in the coverage area of the BS 100.

Once the system is running the BS 100 determines at 908 the average fractional loading over a suitable period, of the order of one minute or longer, for both random access and dedicated signalling transmissions, and computes the ratio of random access loading to dedicated signalling loading.

Next, at 912, this ratio is tested to determine if it is exceeds a first threshold T1. If it does then the load on the random access transmissions is significantly higher than that on the dedicated signalling transmissions, and the BS 100 increases at 914 the proportion of the frames 202 allocated to random access transmissions. If the result of the test 912 was negative the ratio is tested again at 916 to determine if it is less than a second threshold T2. If it is, the load on the random access transmissions is significantly lower than that on the dedicated signalling transmissions, and the BS 100 reduces at 918 the proportion of the frames 202 allocated to random access transmissions.

Thresholds T1 and T2 can be selected by the operator to optimise performance for the particular deployment, depending for example on cell size, propagation environment and traffic characteristics (whether packet or circuit).

After any adjustments have been made, at 914 or 918, the BS 100 returns to step 908 and determines a new load average, then repeats the above steps.

If, as a results of changes to the partitioning of the frames 202, the dedicated signalling time slot allocation for a particular MS 100 needs to be changed, this can be signalled on a physical broadcast channel. When adjustments are made, it is advantageous to avoid allocating dedicated time slots 302 close to the boundary between random access and dedicated signalling portions of the frame 202 as this makes any future changes to the partitioning easier to implement.

From reading the present disclosure, other modifications will be apparent to persons skilled in the art. Such modifications may involve other features which are already known in radio communication systems and component parts thereof, and which may be used instead of or in addition to features already described herein.

What is claimed is:

1. A method of communicating between a secondary station and a primary station, said method comprising the steps of:

establishing an initial communication link between the secondary station and the primary station by having the secondary station transmit a preamble to the primary station via a first channel;

detecting, in the primary station, the transmitted preamble from the secondary station that was transmitted over the first channel; and transmitting, from the primary station to the secondary station, a message via a channel different from the first channel.

2. The method as claimed in claim 1, further comprising the step of:

incorporating in the message a request for a dedicated channel.

3. The method as claimed in claim 1, further comprising the step of:

incorporating in the preamble a set of cell-specific access sequences used by the secondary station.

4. A radio communication system, comprising:

at least a secondary station;

a primary station;

means for establishing an initial communication link between the secondary station and the primary station by having the secondary station transmit a preamble to the primary station via a first channel;

means for detecting, in the primary station, the transmitted preamble from the secondary station that was transmitted over the first channel; and means for transmitting, from the primary station to the secondary station, a message via a channel different from the first channel.

5. A radio communication system, comprising:

at least one secondary station, each secondary station including means for transmitting a random access transmission and a dedicated signaling transmission in an allocated portion of a single uplink channel; and a primary station including means for partitioning the single uplink transmission channel between the random access transmissions and the dedicated signaling transmissions from said at least one secondary station, wherein the uplink channel is partitioned into a plurality of frames, each frame simultaneously including at least one portion allocated to the random access transmissions and at least one portion allocated to the dedicated signaling transmissions.

6. A radio communication system, comprising:

at least one secondary stations, each secondary station including means for transmitting a random access transmission and a dedicated signaling transmission in an allocated portion of a single uplink channel; and a primary station including means for partitioning the single uplink transmission channel between the random access transmissions and the dedicated signaling transmissions from said at least one secondary station, wherein the uplink channel is partitioned into a plurality of frames, each frame simultaneously including at least one portion allocated to the random access transmissions and at least one portion allocated to the dedicated signaling transmissions, and means for dynamically modifying the allocation of the frames between the random access transmissions and the dedicated signaling transmissions.

7. A method of operating a communication system including a secondary station and a primary station, said method comprising:

operating the secondary station to transmit a random access transmission and a dedicated signaling transmission in an allocated portion of a single uplink channel; and operating the primary station including to partition the single uplink transmission channel between the random access transmission and the dedicated signaling transmission from the secondary station, wherein the uplink channel is partitioned into a plurality of frames, each frame simultaneously including at least one portion allocated to the random access transmission and at least one portion allocated to the dedicated signaling transmission.

* * * * *